Figure 4:
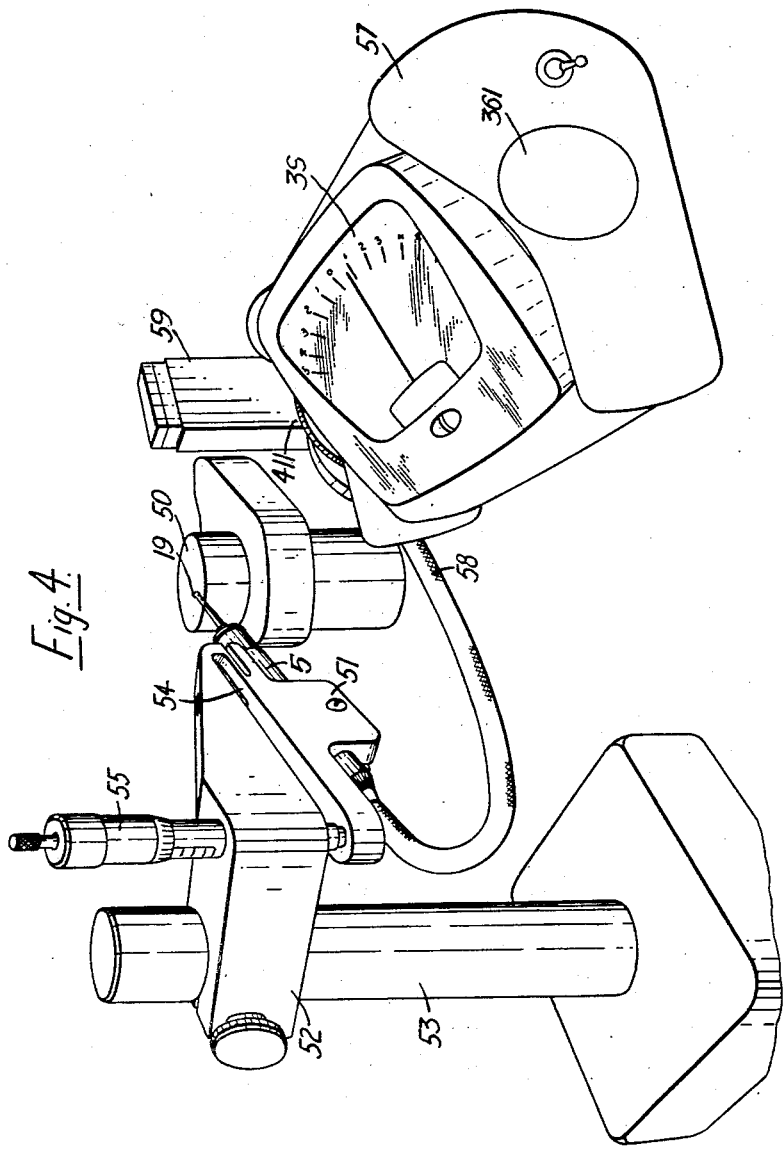

Sept. 22, 1964  R. M. O'BRIEN  3,149,421
MEASURING AND GAUGING DEVICES
Filed Dec. 13, 1961  2 Sheets-Sheet 1
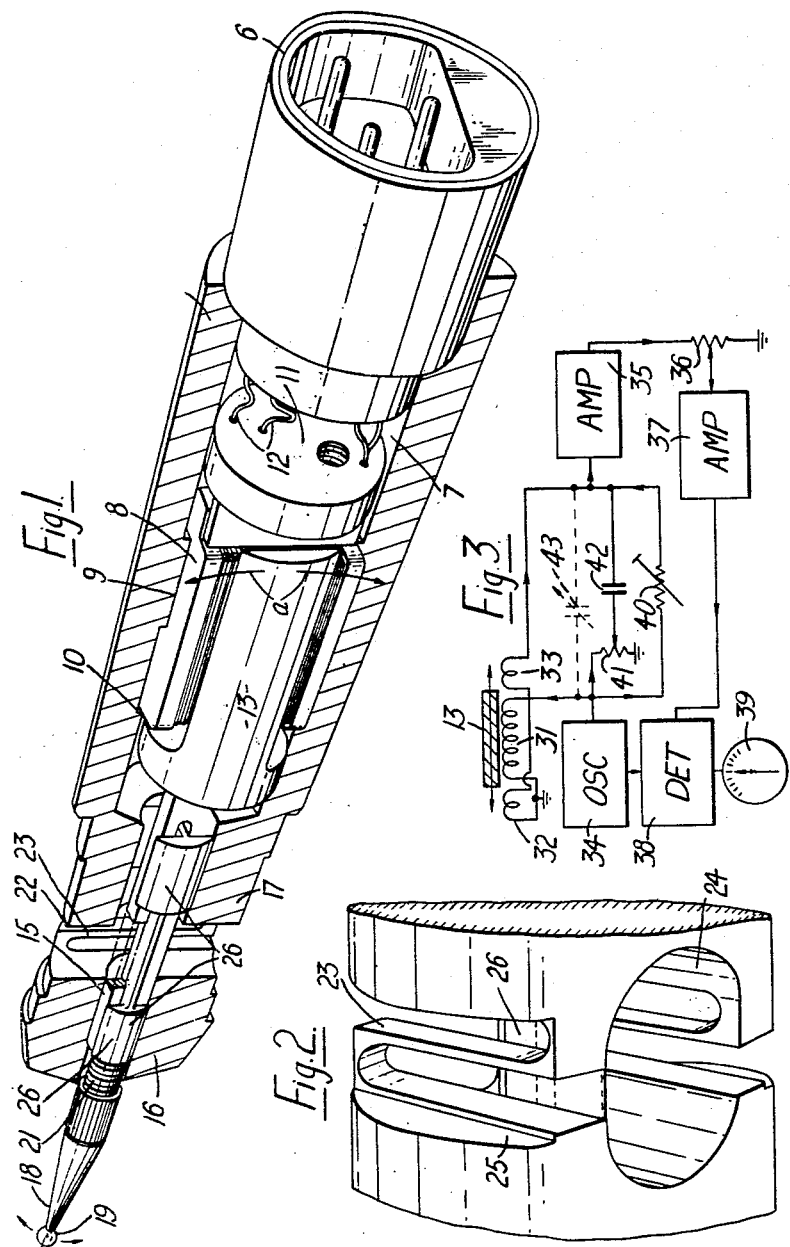
Inventor
RORY MORGAN O'BRIEN
By
H.B. Willson &Co.
Attorney Sept. 22, 1964 R. M. O'BRIEN 3,149,421
MEASURING AND GAUGING DEVICES
Filed Dec. 13, 1961 2 Sheets-Sheet 2

Inventor
RORY MORGAN O'BRIEN

By H.B. Willson & Co.
Attorney 3,149,421
MEASURING AND GAUGING DEVICES
Rory Morgan O'Brien, Welwyn Garden City, England, assignor to Watton Engineering Co., Limited, London, England
Filed Dec. 13, 1961, Ser. No. 159,489
Claims priority, application Great Britain Jan. 24, 1961
5 Claims. (Cl. 33—172)

The present invention relates to measuring and gauging devices having a transducer and a U-shaped metallic member positioned adjacent said transducer and adapted to be moved relatively to said transducer, wherein a cross spring pivot provides a support for the feeler and for the U-shaped member, such as is described in my Patent No. 3,018,556, January 30, 1962.

In accordance with the present invention a feeler mounting comprises a body member housing a transducer and of which one end comprises one section of a cross spring mounting and which body member also houses internally another section of a cross spring mounting for the feeler, said feeler being operatively connected to a metallic member adapted to be swung parallel to the transducer for producing a variable signal adapted to operate indicating mechanism responsive to the movement of the feeler.

Conveniently, the second section of the cross spring mounting comprises an insert having partly cylindrical end parts accommodated respectively in bore parts of the body located on each side of the first cross spring section formed by cutting away parts of said body transversely from opposite directions to leave blade-like sections between them to permit the tip part of the body to move relatively to the remainder of the body, a forked extension of said metallic member being fixedly connected to the cylindrical part of the insert member fitted in the bore near the outer end of the body while the other end of said insert member is arranged to have clearance relatively to the forked extension so that said metallic member can swing pivotally in response to movements imparted to the feeler, giving the metallic member a movement across the transducer.

The features of the present invention are shown by way of example on the accompanying drawing in which:

FIG. 1 is a perspective view of the feeler mounting partially cut away to show the construction, FIG. 2 is an enlarged view showing the construction of the first cross spring mounting formed in the tubular body of the feeler mounting, FIG. 3 is a circuit diagram showing the indicating equipment operated by the feeler head, and FIG. 4 is a diagrammatic view showing one manner of using the device according to the present invention.

The feeler mounting shown in FIG. 1 comprises a tubular body 5 having at one end a coupling adaptor 6 for connecting the leads from a transducer coil assembly 8 to an external operating circuit. The body 5 has an enlarged bore part 7 at the end nearest the adaptor 6 within which is accommodated the assembly 8, consisting of a support or former of non-metallic material, preferably polystyrene, in the form of a rectangular block which is located within a reduced portion 9 of the body formed with a rectangular cut-out to accommodate the transducer coil assembly neatly, thus locating it in position, the coil assembly being inserted in the body until it meets a shoulder 10 which serves to define the position of the assembly within the body.

A block 11 of insulating material is fixed to the transducer assembly 8 and is provided with apertures through which pass the leads 12 from the transducer winding to the adaptor 6.

The enlarged bore portion 7 of the body 5 serves to accommodate a bifurcated sensing lever 13 formed of metal, preferably of non-magnetic metal such as aluminium, which is movable with a sweeping action over the transducer 8, as indicated by the arrows $a$, that is to say it swings in a plane parallel to the transducer coil assembly 8.

The sensing lever 13 is provided with a forked forward extension 15 the tips or ends of its two arms extending into the tip part 16 of the body. The part of the main portion of the body 5 lying forwardly of the enlarged bore portion 7 is formed with a comparatively small bore and is of reduced external diameter as indicated at 17; this part may be surrounded by a protective sleeve (not shown) of rubber for example.

The forward tip part 16 of the body 5 carries a detachable feeler probe 18 preferably having a ball point 19, the stem portion of the probe being knurled to assist removal of the probe from the supporting screw 21 to which it is fixed. This forward tip part 16 is supported by means of a cross spring mounting, a first section of which is provided by oppositely directed slots 22 formed in the forward reduced portion 17 of the body 5, as shown in greater detail on FIG. 2. It will be seen that this first section of the cross spring mounting comprises blade portions 23 defined by means of a transverse aperture 24 formed in the forward part 17 of the body and by chord-like milled out portions 25 running parallel to the bore or aperture 24 so that the blade portions 23 provide a deflectable mounting for the tip part 16 of the body 5. As shown the tip and main portions of the tubular body are formed in one piece and are integrally connected by the blade portions 23 but these parts may be otherwise constructed.

The second section of the cross spring mounting is provided by a member 26 inserted in the smaller bore towards the forward end of the main portion of the body and also in an axially aligned bore in the tip portion 16. The member 26 has partly cylindrical end parts which are of H-shape in cross section while the intermediate part lying between the end parts is in the form of a blade or strip, the direction of which runs at right angles to the blade portions 23.

The front end of the forked extension 15 of the sensing lever 13 embraces the forward portion of the member 26 and has a tight fit upon the forward end part of the latter accommodated within the movable tip part 16 of the body, the three parts concerned, namely the bore of the tip 16, the ends of the two arms of the fork 15 and the associated end of the member 26, being immovably held in position by a suitable cement.

The remaining portions of the two arms of the fork 15 lie clear of the blade portion of the member 26 as shown in FIG. 1, while the rear end part of the member 26 has a close fit within the bore of the main portion of the body. It will be seen that with this arrangement the body tip part 16, together with the probe 18 fixed to it, are supported by the cross spring mounting provided by the blades 23 and 26 to provide a light but effective yielding support for the probe 18 to impart pivotal movement to the fork 15 and to the sensing lever 13 attached to it or formed integrally therewith, such movement being permitted by the clearance between the root of the fork 15 and the blade part of the member 26 surrounded by it.

Such movement imparted to the sensing lever 13 is operative in respect to the transducer coil winding and is thus capable of producing a circuit change for operating an electronic circuit capable of deflecting, with a suitable degree of magnification, an indicator device registering on a magnified scale the movement of the probe 18.

Various electronic circuitry design features may be adopted but conveniently the transducer may be designed to provide for an amplitude change in an alternating current derived from a suitable oscillator, the variable amplitude output signal from the transducer being applied, together with a reference input from the oscillator, to a coherent or phase discriminating detector to provide a rectified output capable of operating an indicating meter or other suitable responder device, with reversal of polarity when the transducer coupling passes through zero and the sense changes by movement of the sensing lever 13.

Conveniently, the transducer may be formed in three separate sections, the coupling between the three sections being modified according to the movement of the sensing lever. The transducer may be arranged so that the coupling is substantially zero with the sensing lever in its mid position. The three winding sections concerned may comprise a centre section which is earthed at one end to the body of the equipment and which receives an input from the oscillator at its other end. This winding is flanked by two half windings on opposite sides thereof, these two windings being wound in mutually opposite directions and being coupled in series, one end being connected to earth and the other end providing a variable output. This arrangement of the coils is shown on FIG. 3 of the drawings, the three coils being shown at 31, 32, 33. An oscillator 34 feeds the coil 31 and the two coil sections 32 and 33 provide an output which is fed to an amplifier 35, which is preferably a resistance coupled amplifier, the output of which is fed to a gain control 36 then to a further amplifier 37 and thence to a coherent or phase discriminating detector 38 which receives a reference input from the oscillator 34. The output from the detector provides a variable D.C. signal for operating the meter 39 which reproduces the movement of the probe 18 with a magnification dependent primarily upon the setting of the gain control 36.

Additional features and refinements are shown on FIG. 3, for example a quadrature control variable resistor 40, which may be a preset adjustment, is preferably provided to permit cancelling out any unwanted quadrature components from the transducer coil assembly and an additional voltage may be injected by means of a potentiometer 41 and series capacitor 42 to provide for a zero shift of the meter 39. Alternatively, or in addition, a further variable capacitor 43 may be provided as an additional shift control and if two zero shifts 41 and 43 are provided one of them may be calibrated and the other uncalibrated to permit the equipment to be operated in the manner described in said Patent No. 3,018,556.

By virtue of the circuit features described the displacement of the sensing lever 13 unbalances the coupling between the coil 31 of the coil sections 32, 33 to provide a signal varying in voltage and phase which is applied to the detector 38 and serves for operating the meter 39. This signal is substantially linear as regards amplitude with displacement of the sense lever 13 and the sense of the output signal depends on the direction of displacement from the symmetrical or zero position. Any harmonic frequencies that may remain in the output circuit can, if necessary, be tuned out of the system by means of suitable resonant circuits.

The feeler mounting shown in FIG. 1 of the drawings is preferably oriented in use in the manner indicated thereon, namely with its major axis in line with the axis of the body 5. This is the optimum position for stability, but it may also be used in other positions in accordance with the particular measuring requirements which may be encountered.

The feeler mounting shown is quite versatile and may be used in various ways and for performing various measuring functions. It and its associated equipment may together be utilised inter alia for performing any of the class of measurements which are commonly performed by dial gauges, but the high sensitivity and stability of the instrument and its associated indicating meter 39 permit measurements to be made with confidence to a much higher degree of sensitivity than can be obtained with a normal type of dial gauge, and the scale reading on the meter 39 is substantially linear, while further the sensitivity can be accurately controlled and calibrated. Furthermore, the instrument can be designed to function effectively with a very small restoring force upon the probe tip, which permits measurements to be made under circumstances where the workpiece itself or the support for the feeler mounting would be liable to deflection under the restoring force necessarily exerted by conventional types of dial gauge.

Calibration of the reading of the meter 39 may be obtained by substitution of reference gauges having a known small dimensional difference, for example .001", or, alternatively, by means of thickness gauges consisting of plastic foil as described in my copending application Serial No. 159,492, filed December 31, 1961. The use of such gauges permits measurements to be made, as explained in said specification, under circumstances where the workpiece and/or the mount for the sensing head may be subjected to measurable deflection under measurement conditions.

As already indicated the circuit features shown may provide for the use of calibrated and uncalibrated zero controls, permitting the equipment to be operated in the manner described in said Patent No. 3,018,556, but in many cases it may be preferable to effect calibration of the scale by means of some form of gauge, such as the plastic foil gauge referred to, since this permits the calibration to be performed with the equipment actually installed under its functional measurement conditions.

FIG. 4 illustrates, by way of example, a method of, and equipment for using the device in a manner somewhat similar to a comparator height gauge. In this case the workpiece 50 is assumed to be supported on a surface plate and is engaged by the probe tip 19. The body 5 is mounted in a clamp plate 51 forming an adjustable section of a vertically movable carrier 52 clamped to a vertical support column 53 carried by a base member resting upon the said surface plate. The part 51 is yieldable relatively to the body part of the carrier 52 by means of a crossed spring mounting 54 substantially similar to that used in the sensing head serving as a spring pivot for the clamp plate 51.

A micrometer screw adjustment device 55 mounted on the carrier 52 includes a movable member which presses upon the end part of the section 51 so as to effect deflection of the body 5 and to bring the probe tip 19 into operative engagement with the workpiece 50. The micrometer screw 55 may thus, for example, serve as calibrated zero adjusting means for the feeler mounting as a whole, such adjustment and calibration being finer than normally possible with a micrometer, by virtue of the lever action of the carrier 52, the crossed spring mounting 54 and the probe tip 19. The indicating meter 39 is shown as forming part of a control unit housing 57 which is a separate and portable unit connected to the feeler mounting by means of a flexible cable 58 coupled to the adaptor 6. The various elements of the circuit diagram of FIG. 3 are incorporated in the housing 57, the gain control 36 having an external operating knob 361 and the zero shift potentiometer 41 having an external adjusting knob 411.

A gauge block 59 is shown which may, of course, be assembled from a number of gauge blocks and, in accordance with normal practice, these blocks represent the intended dimensions of the workpiece 50 as sensed by the tip 19 of the probe. Assuming that the instrument has already been calibrated, replacement of the workpiece 50 by the gauge block assembly 59 will show at once whether the workpiece is of the prescribed dimensions or not to whatever degree of accuracy is required for the particular purpose envisaged and any differences in dimensions are shown by the reading of the meter 39, or can be determined by the micrometer 55.

Adjustment of the instrument to the gauge blocks 59 may conveniently be performed by combined use of the micrometer adjustment 55 and of the uncalibrated zero-ising knob 411, the micrometer 55 being set to a predetermined reference point and, with the gauges 59 in position, the meter 39 set to the zero point by the control knob 411. It is then possible to obtain dimension readings either, for small differences, by the reading of the meter 39, or, for larger differences, by adjustment of the micrometer 55 to bring the meter back to the zero position.

Calibration of the meter 39 may be effected by using two gauge blocks having a known difference in size, for example .001", one gauge block being replaced by the other and the gain control 361 adjusted until the correct scale reading is obtained on the meter 39. Alternatively, this calibration may be performed by means of a plastic foil thickness gauge, as described in said application Serial No. 159,492.

It will, of course, be understood that FIG. 4 is only representative of numerous ways in which the equipment can be used. A stand comparable to the elements 51–54 may be mounted upon the table of a machine tool and presented to a workpiece held in a chuck. In such cases the machine tool slides may be provided with micrometer adjustment devices which perform the same function as the micrometer 55 shown on FIG. 4 of the drawings.

What I claim is:

1. A feeler mounting for a measuring or gauging device including a transducer adapted to control an electrical circuit in turn operating a responder device registering the movements of a feeler, said feeler mounting comprising a tubular body member housing the transducer towards its rear end and providing a first section of a cross spring mounting for the feeler towards the front end, a second cross spring section accommodated at its ends in bores in the body member on the two sides of said first section, said second section being of H-section at its ends accommodated in said bores and comprising a blade portion between said ends, a forked member overlying said blade portion, said forked member having tight engagement around that end of the second cross spring section remote from the transducer and within the bore receiving said end of the second cross spring section, a feeler fixed within said last-named bore and projecting outwardly of the body member, said feeler imparting movement to one end of the forked member against the action of the two co-ordinated cross spring sections, said forked member being freely movable transversely to said first cross spring section at the opposite end of the latter to allow for limited swinging movement, and a metallic member fixed to said forked member adjacent the transducer, whereby said forked member is adapted to swing in a direction parallel to the transducer for producing a variable signal for operating the responder device.

2. A feeler mounting according to claim 1, comprising a holder for the tubular body member, a carrier springily connected to the holder and micrometer means for adjusting the holder relatively to the carrier to regulate the presentation of the feeler selectively to a workpiece or to a gauge member to obtain co-ordinated readings from the micrometer means and and from the responder device operated by the signal from the transducer device.

3. A feeler mounting for a measuring or gauging device including a transducer adapted to control an electrical circuit in turn operating a responder device registering the movements of a feeler, said feeler mounting comprising a tubular body member housing the transducer at its rear end and providing a first section of a cross spring mounting for the feeler at its front end, a second cross spring section accommodated in a bore towards the outer end of said body member, said second cross spring section being of H-shape in section at its ends and comprising a blade portion between said ends, said blade portion being coincident with the said first section of the cross spring mounting, a sensing lever, a forked extension on said sensing lever, said extension embracing said blade portion and having tight engagement with the H-shaped end of said second cross spring section adjacent the outer end of the body member and being freely movable transversely to said first cross spring section at the front end of the body to allow for limited swinging movement, said sensing lever having a metallic member disposed adjacent the transducer whereby said metallic member is adapted to swing in a direction parallel to the transducer for producing a variable response signal, and a feeler fixed to the end of said second cross spring section adjacent the front end of the body member.

4. A feeler mounting for a measuring or gauging device including a transducer adapted to control an electric circuit in turn operating a responder device registering the movements of a feeler, said feeler mounting comprising, (A) a tubular member having a main portion and a front tip portion, the two portions having axially alined bores, (B) a transducer housed in the rear part of said main portion of the body member, (C) a first section of a cross spring mounting for a feeler, connecting said tip and main portions of the body member, (D) a second section of said cross spring mounting comprising a blade portion connecting part-cylindrical end portions of H-shape in cross section disposed in said bores in the tip and main portions of the body member, (E) a metallic member associated with said transducer in the main portion of said body member, (F) a forked member projecting forwardly from said metallic member and having its two arms disposed on opposite sides of said blade portion, the front ends of the arms of the fork member and forward H-shaped end portion of said second section of the cross spring being immovable in the bore in said tip portion of the body member, (G) a feeler fixed within the last mentioned bore and projecting outwardly from the body member, said feeler imparting movement to one end of the forked member against the action of the two coordinated cross spring sections, said forked member being freely movable transversely to said first cross spring section whereby said metallic member is adapted to swing in a direction parallel to the transducer for producing a variable response signal for operating the responder device.

5. The feeler mounting of claim 4 in which said tip and main portions of said body member are formed in one piece and said first section of the cross spring mounting connects the two portions and comprises two integral blade-like portions defined by an aperture cut transversely through the body in the plane of the blade-like portions and normal to the ends of two oppositely directed transverse slots in the body, the outside of the body at said slots being cut away in a direction parallel to the transverse aperture to give said blade-like portions parallel sided form.

References Cited in the file of this patent

UNITED STATES PATENTS

| | | |
|---|---|---|
| 2,508,370 | Bozoian | May 23, 1950 |
| 2,633,642 | Levesque | Apr. 7, 1953 |
| 2,737,723 | Graham et al. | Mar. 13, 1956 |
| 3,018,556 | O'Brien | Jan. 30, 1962 |